(12) United States Patent
Wigard et al.

(10) Patent No.: US 12,659,828 B2
(45) Date of Patent: Jun. 16, 2026

(54) MECHANISM FOR TRANSITION TO ANOTHER CELL WITHOUT HANDOVER IN A NON-TERRESTRIAL NETWORK

(71) Applicant: Nokia Technologies Oy, Espoo (FI)

(72) Inventors: Jeroen Wigard, Aalborg (DK); Enric Juan, Aalborg (DK); Jedrzej Stanczak, Wroclaw (PL); Frank Frederiksen, Aalborg (DK); Ahmad Masri, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 18/968,453

(22) Filed: Dec. 4, 2024

(65) Prior Publication Data

US 2025/0126537 A1 Apr. 17, 2025

Related U.S. Application Data

(63) Continuation of application No. 18/800,558, filed on Aug. 12, 2024.

(30) Foreign Application Priority Data

Aug. 22, 2023 (FI) ...................................... 20235931

(51) Int. Cl.
*H04W 36/08* (2009.01)
*H04W 36/00* (2009.01)
*H04W 36/02* (2009.01)
(52) U.S. Cl.
CPC ..... *H04W 36/083* (2023.05); *H04W 36/0072* (2013.01); *H04W 36/023* (2013.01)

(58) Field of Classification Search
CPC ........... H04W 36/083; H04W 36/0072; H04W 36/023
See application file for complete search history.

(56) References Cited

U.S. PATENT DOCUMENTS

| | | | |
|---|---|---|---|
| 2024/0048227 A1* | 2/2024 | Leng ................... | H04B 7/18513 |
| 2024/0163688 A1* | 5/2024 | Tsai ....................... | H04L 5/0094 |
| 2025/0047374 A1* | 2/2025 | Jo ....................... | H04W 56/0045 |
| 2025/0048295 A1* | 2/2025 | Kim ................... | H04W 56/0045 |

FOREIGN PATENT DOCUMENTS

| | | |
|---|---|---|
| WO | 2021/022489 A1 | 2/2021 |

OTHER PUBLICATIONS

""Unchanged PCI" solution vs "PCI change only" solution", 3GPP TSG-RAN WG2 Meeting #122, R2-2306517, Agenda: 7.7.4.2, Sequans Communications, May 22-26, 2023, 5 pages.
(Continued)

*Primary Examiner* — Justin Y Lee
(74) *Attorney, Agent, or Firm* — Lippes Mathias LLP

(57) ABSTRACT

The present disclosure relates to on transition to another cell without handover in non-terrestrial network (NTN). In particular, a NTN device transmits information related to a set of NTN devices to a terminal a first device receives assistance information of a NTN device from a second device. The assistance information at least indicated a type of a cell switching. The first device skips buffer flushing and security key updating regardless of the type of cell switching. In this way, it can achieve cell switching without handover.

17 Claims, 5 Drawing Sheets

100

(56) References Cited

OTHER PUBLICATIONS

"3rd Generation Partnership Project; Technical Specification Group Radio Access Network; NR; Radio Resource Control (RRC) protocol specification (Release 17)", 3GPP TS 38.331, V17.4.0, Mar. 2023, pp. 1-1324.

"IEEE 802.11", Wikipedia, Retrieved on Jan. 9, 2024, Webpage available at : https://en.wikipedia.org/wiki/IEEE_802.11.

Office action received for corresponding Finnish Patent Application No. 20235931, dated Jan. 12, 2024, 8 pages.

"Satellite Switch: PCI change without L3 handover", 3GPP TSG-RAN WG2 #123, R2-2308373, Agenda: 7.7.4.2, NEC, Aug. 21-25, 2023, 6 pages.

"On Unchanged PCI and Satellite Switching without L3 Mobility", 3GPP TSG-RAN WG2 Meeting #123, R2-2307581, Agenda: 7.7.4.2, Nokia, Aug. 21-25, 2023, 6 pages.

"3rd Generation Partnership Project; Technical Specification Group Radio Access Network; NR; Medium Access Control (MAC) protocol specification (Release 18)", 3GPP TS 38.321 V18.1.0, Mar. 2024, pp. 1-322.

International Search Report and Written Opinion received for corresponding Patent Cooperation Treaty Application No. PCT/EP2024/072822, dated Nov. 4, 2024, 17 pages.

"Satellite Switch: PCI change without L3 handover", 3GPP TSG-RAN WG2 #122, R2-2305152, Agenda: 7.7.4.2, NEC, May 22-26, 2023, 6 pages.

"Discussion on unchanged PCI scenario", 3GPP TSG-RAN WG2 Meeting #122, R2-2304899, Agenda: 7.7.4.2, CATT, May 22-26, 2023, 4 pages.

* cited by examiner

100

600

MECHANISM FOR TRANSITION TO ANOTHER CELL WITHOUT HANDOVER IN A NON-TERRESTRIAL NETWORK

RELATED APPLICATIONS

The present application is a 37 C.F.R. § 1.53(b) continuation of co-pending U.S. patent application Ser. No. 18/800,558 filed Aug. 12, 2024, which claims priority to Finnish Application No. 20235931, filed on Aug. 22, 2023, all of which are incorporated herein by reference.

FIELDS

Various example embodiments of the present disclosure generally relate to the field of telecommunication and in particular, to methods, devices, apparatuses and computer readable storage medium for transition to another cell without handover in non-terrestrial network (NTN).

BACKGROUND

The Third Generation Partnership Project (3GPP) has initiated a discussion on NTN. For example, feasibility of using fifth generation (5G) new radio (NR) standards to support non-terrestrial networks has been studied during 3GPP releases 15 and 16. In particular, user equipments (UEs) supporting NTN are assumed to have Global Navigation Satellite System (GNSS) capability. In an NTN system, 5G base stations (gNB) or gNB functionality are deployed on board satellites or relayed by satellites in a transparent way to provide communication coverage over a very large area that may be otherwise unreachable by cellular networks. Such functionality can be used to connect internet of thing (IoT) devices globally as well as provide personal communication in remote areas.

SUMMARY

In a first aspect of the present disclosure, there is provided a first apparatus. The first apparatus comprises at least one processor; and at least one memory storing instructions that, when executed by the at least one processor, cause the first apparatus to: receive, from a second apparatus, assistance information for switching from a source non-terrestrial device to a target non-terrestrial device, wherein the assistance information comprises an indication about a cell identity change associated with the switching; and cause at least one of the following to be maintained for a plurality of alternatives of the indication: a hybrid automatic repeat request, HARQ, buffer, security key for radio communication, or a cell configuration.

In a second aspect of the present disclosure, there is provided a second apparatus. The second apparatus comprises at least one processor; and at least one memory storing instructions that, when executed by the at least one processor, cause the second apparatus to: transmit, to a first apparatus, assistance information for switching from a source non-terrestrial device to a target non-terrestrial device, wherein the assistance information comprises an indication about a cell identity change associated with the switching; and cause at least one of the following to be maintained for a plurality of alternatives of the indication: a hybrid automatic repeat request, HARQ, buffer, or security key for radio communication, or a cell configuration.

In a third aspect of the present disclosure, there is provided a method. The method comprises: receiving, from a second apparatus, assistance information for switching from a source non-terrestrial device to a target non-terrestrial device, wherein the assistance information comprises an indication about a cell identity change associated with the switching; and causing at least one of the following to be maintained for a plurality of alternatives of the indication: a hybrid automatic repeat request, HARQ, buffer, security key for radio communication, or a cell configuration.

In a fourth aspect of the present disclosure, there is provided a method. The method comprises: transmitting, to a first apparatus, assistance information for switching from a source non-terrestrial device to a target non-terrestrial device, wherein the assistance information comprises an indication about a cell identity change associated with the switching; and causing at least one of the following to be maintained for a plurality of alternatives of the indication: a hybrid automatic repeat request, HARQ, buffer, or security key for radio communication, or a cell configuration.

In a fifth aspect of the present disclosure, there is provided a first apparatus. The first apparatus comprises means for receiving, from a second apparatus, assistance information for switching from a source non-terrestrial device to a target non-terrestrial device, wherein the assistance information comprises an indication about a cell identity change associated with the switching; and means for causing at least one of the following to be maintained for a plurality of alternatives of the indication: a hybrid automatic repeat request, HARQ, buffer, a security key for radio communication, or a cell configuration.

In a sixth aspect of the present disclosure, there is provided a second apparatus. The second apparatus comprises means for transmitting, to a first apparatus, assistance information for switching from a source non-terrestrial device to a target non-terrestrial device, wherein the assistance information comprises an indication about a cell identity change associated with the switching; and means for causing at least one of the following to be maintained for a plurality of alternatives of the indication: a hybrid automatic repeat request, HARQ, buffer, or a security key for radio communication, or a cell configuration.

In a seventh aspect of the present disclosure, there is provided a computer readable medium. The computer readable medium comprises instructions stored thereon for causing an apparatus to perform at least the method according to the third aspect.

In an eighth aspect of the present disclosure, there is provided a computer readable medium. The computer readable medium comprises instructions stored thereon for causing an apparatus to perform at least the method according to the fourth aspect.

It is to be understood that the Summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
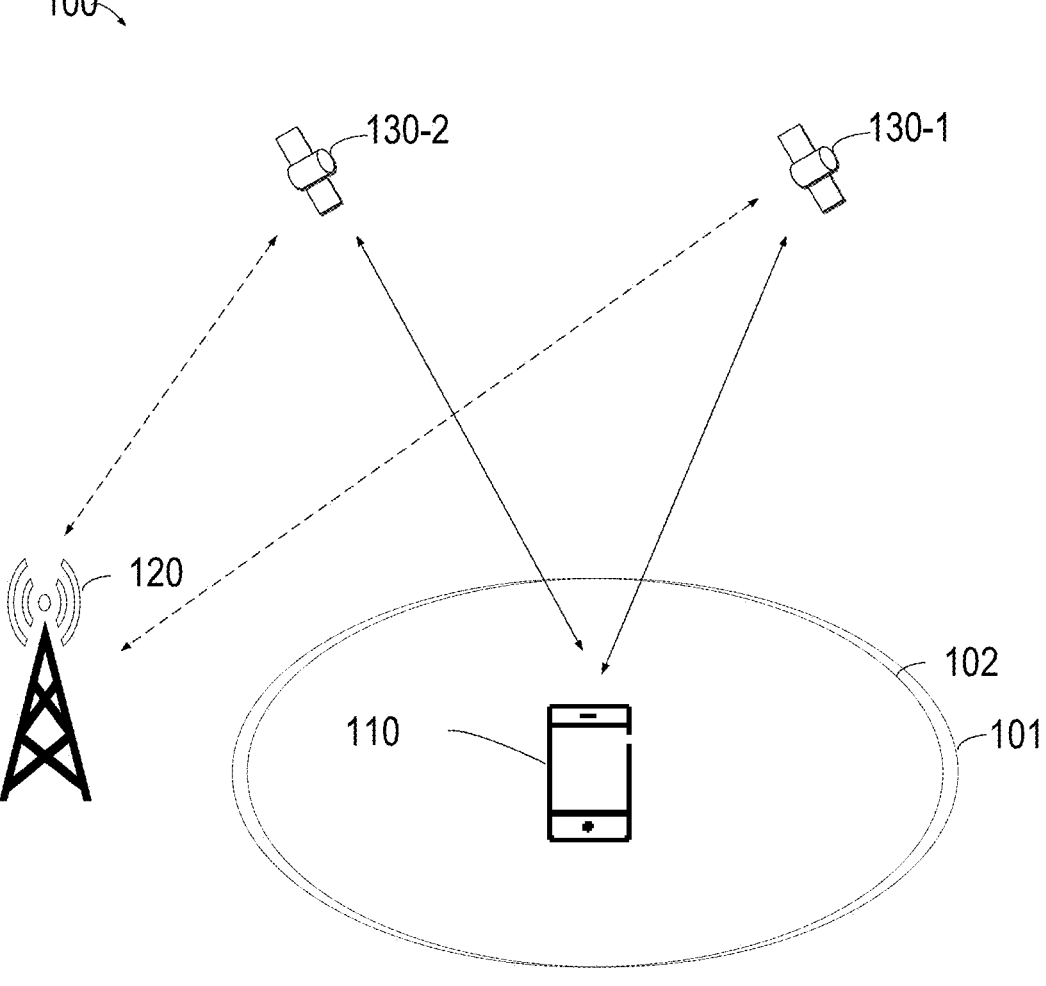
FIG. 1 illustrates an example communication environment in which example embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. Embodiments described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first," "second," . . . , etc. in front of noun(s) and the like may be used herein to describe various elements, these elements should not be limited by these terms. These terms are only used to distinguish one element from another and they do not limit the order of the noun(s). For example, a first element could be termed a second element, and similarly, a second element could be termed a first element, without departing from the scope of example embodiments. As used herein, the term "and/or" includes any and all combinations of one or more of the listed terms.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

As used herein, unless stated explicitly, performing a step "in response to A" does not indicate that the step is performed immediately after "A" occurs and one or more intervening steps may be included.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as New Radio (NR), Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G), the sixth generation (6G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), an NR NB (also referred to as a gNB), a Remote Radio Unit (RRU), a radio header (RH), a remote radio head (RRH), a relay, an Integrated Access and Backhaul (IAB) node, a low power node such as a femto, a pico, a non-terrestrial network (NTN) or non-ground network device such as a satellite network device, a low earth orbit (LEO) satellite and a geosynchronous earth orbit (GEO) satellite, an aircraft network device, and so forth, depending on the applied terminology and technology. In some example embodiments, radio access network (RAN) split architecture comprises a Centralized Unit (CU) and one or more Distributed Unit (DU).

The term "non-terrestrial network (NTN)" used herein may refer to a network that involves non-terrestrial flying object. For example, the NTN network may include a satellite communication network, a high altitude platform system (HAPS), and/or an air-to-ground network. The term "NTN device" may refer to a network device that involves in the NTN. For example, the NTN device may be a satellite which may host a radio access network (RAN) node.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. The terminal device may also correspond to a Mobile Termination (MT) part of an IAB node (e.g., a relay node). In the following description, the terms "terminal device", "communication device", "terminal", "user equipment" and "UE" may be used interchangeably.

As used herein, the term "resource," "transmission resource," "resource block," "physical resource block" (PRB), "uplink resource," or "downlink resource" may refer to any resource for performing a communication, for example, a communication between a terminal device and a network device, such as a resource in time domain, a resource in frequency domain, a resource in space domain, a resource in code domain, or any other combination of the time, frequency, space and/or code domain resource enabling a communication, and the like. In the following, unless explicitly stated, a resource in both frequency domain and time domain will be used as an example of a transmission resource for describing some example embodiments of the present disclosure. It is noted that example embodiments of the present disclosure are equally applicable to other resources in other domains.

The term "hybrid automatic repeat request (HARQ)" used herein may refer to a combination of high-rate forward error correction (FEC) and automatic repeat request (ARQ) error-control, which is implemented to correct the erroneous packets coming from physical layer. The term "HARQ process" may refer to a stop-and-wait process that is used to transmit data. Each HARQ process has an independent HARQ buffer. The term "buffer flushing" used herein may refer to a mechanism that delete data stored in a buffer. The term "security key changing" used herein may refer to a mechanism that update security information of communication.

The term "radio link control (RLC)" used herein may refer to a layer 2 protocol used on an air interface. The RLC layer can provide a full reliable transport service for selected transmissions. The term "packet data convergence protocol (PDCP)" used herein may refer to a layer that lies between a radio resource control (RRC) on upper side and radio link control (RLC) on lower side of a control protocol stack. PDCP layer provides services to the upper layers that are, RRC or service data adaptation protocol (SDAP) and takes services and inputs from the RLC layer, medium access control (MAC) layer, and physical (PHY) layer. The term "switching" or "satellite switching" used herein may refer to a mechanism where the UE will not disconnect but the NTN device that the data is sent through is switched and the UE resynchronize with the NTN device.

The term "physical cell identity (PCI)" used herein may refer to an identity that can be included in system information block (SIB) and can be derived after decoding primary synchronization signal/secondary synchronization signal (PSS/SSS) signals and it helps UE to identify and differentiate neighbor cells at physical layer.

As mentioned above, feasibility of using 5G NR standards to support non-terrestrial networks has been studied. There are different types of satellite orbits that have been studied for NR access including Low Earth Orbit (LEO) satellites which are between 500-1500 km height. LEO is assumed to be the most relevant case. During a study item the typical beam footprint size for a LEO satellite was assumed to be between 100-1000 km radius.

In some solutions, an unchanged physical cell identity (ID) (PCI) mobility mechanism has been agreed with the goal of reducing the signaling overhead and simplifying radio resource control (RRC) procedures for the UE. In particular, after a satellite switching, a serving gNB (on ground) does not change and, therefore, a cell configuration can be kept without changing the PCI, frequency, and other cell configuration parameters (e.g., servingCellconfigCommon). Then, the satellite switching is almost transparent for the UE, which is not required to perform L3 mobility (i.e., handover procedure). The conditions for the mechanism to work may be the network (NW) should indicate the UE how/when to perform DL and UL synchronization after satellite switching, or the network would accept an interruption gap for the UE to detect the new timing and adapt to this. For example, the mechanism may be applied to a scenario where NTN cells may be deployed as quasi-Earth fixed cells (EFC). The mechanism may also apply to earth moving cells. The network needs to have means for avoiding radio link failure (RLF) during this interruption gap (i.e., after the "old" cell disappears and before the "new" cell takes over). Further in Release-18 the focus is on transparent architecture and the simplest case is when the cells are provided by the same gNB, i.e., the same cell with the fixed PCI is provided by the same gNB, so only the satellite node is changed. However, some terminal devices (for example, release 17 devices) do not support unchanged PCI mobility mechanism. Therefore, a solution on transition to another cell without handover in non-terrestrial network NTN is needed.

According to example embodiments, a first device receives assistance information of a NTN device from a second device. The assistance information at least indicates a cell identity change associated with the switching. The first device skips buffer flushing, security key refreshing, and cell configuration updating for a plurality of alternatives of the indication. In this way, it can achieve cell switching without handover.

FIG. 1 shows an example communication network 100 in which embodiments of the present disclosure can be implemented. As shown in FIG. 1, the communication network 100 may comprise a first device 110. The communication network 100 may further comprise a second device 120. Further, the communication network 100 may also include a first NTN device 130-1 and a second NTN device 130-2. Only for the purpose of illustrations, the first NTN device 130-1 can be described as a source NTN device and the second NTN device 130-2 can be described as a target NTN device. In some scenarios, the first NTN device 130-1 or the second NTN device 130-2 may be hosted in satellites.

In some example embodiments, if the first device 110 is a terminal device and the second device 120 is a network device, a link from the second device 120 to the first device 110 is referred to as a downlink (DL), while a link from the first device 110 to the second device 120 is referred to as an uplink (UL). In DL, the second device 120 is a transmitting (TX) device (or a transmitter) and the first device 110 is a receiving (RX) device (or a receiver). In UL, the first device 110 is a TX device (or a transmitter) and the second device 120 is a RX device (or a receiver).

It is to be understood that the number of network devices and terminal devices shown in FIG. 1 is given for the purpose of illustration without suggesting any limitations. The communication network 100 may include any suitable number of network devices and terminal devices.

Communications in the communication environment 100 may be implemented according to any proper communication protocol(s), includes, but not limited to, cellular communication protocols of the first generation (1G), the second generation (2G), the third generation (3G), the fourth generation (4G) indicating narrow band internet of thing (NB-IoT) and enhanced machine type communication (eMTC), the fifth generation (5G), the sixth generation (6G), and the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, includes but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future.

In some example solutions, a satellite switching where PCI is kept unchanged in a transparent-based EFC deployment can be applied to the communication network 100. For example, the first device 110, which is stationary, is being served by the first NTN device 130-1 (i.e., cell 101). As the first NTN device 130-1 moves away from the first device 110 and the second NTN device 130-2 gets closer, the second device 120 which is routing serving cell through the first NTN device 130-1 may indicate when the first NTN device 130-1 will be switched off, when the second NTN device 130-2 will become available and how to perform re-synchronization to the new cell.

After the second NTN device 130-2 takes over (i.e., providing the cell 102), the first device 110 may perform DL/UL synchronization operations to resume TX/RX. In this case, even though the first device 110 is being served by a new NTN device (i.e., the second NTN device 130-2), it does not change the serving gNB so it can keep the cell configuration. In some example embodiments, the first NTN device 130-1 and the second NTN device 130-2 may be configured with the same PCI, same UE context and same protocol stack (including synchronization signal block (SSB) generation, coding/decoding, modulation/demodulation, same control resource set (CORESET) configuration, and switch routing). Further, from the UE's reference, the first NTN device 130-1 and the second NTN device 130-2 may introduce different frequency (i.e., Doppler) and timing drifts.

The satellite switching can be broken down in two additional scenarios: i) hard satellite switching and ii) soft satellite switching. The latter considers a certain cell overlapping between the NTN cell radiated by the first NTN device 130-1 and the second NTN device 130-2, while the former considers no coverage overlapping in time between the old (i.e., the cell 101) and the new cell (i.e., 102). For the soft satellite switching it may be assumed that the first NTN device 130-1 and the second NTN device 130-2 are transmitting SSBs at the same time (potentially with same PCI, but different time/frequency offset), thereby allowing the first device 110 to gracefully switch to the new (incoming) satellite.

In some solutions, in quasi-earth fixed cell case, for hard satellite switch in the same SSB frequency and same gNB (no key change), satellite switching without PCI changing (not requiring L3 mobility) may be supported. Further, in hard switch unchanged PCI scenario (i.e., no handover), the first device 110 may need to know the time the first device 110 attempts to re-synchronize with the second NTN device 130-2.

Example embodiments of the present disclosure will be described in detail below with reference to the accompanying drawings.

Figure 2:
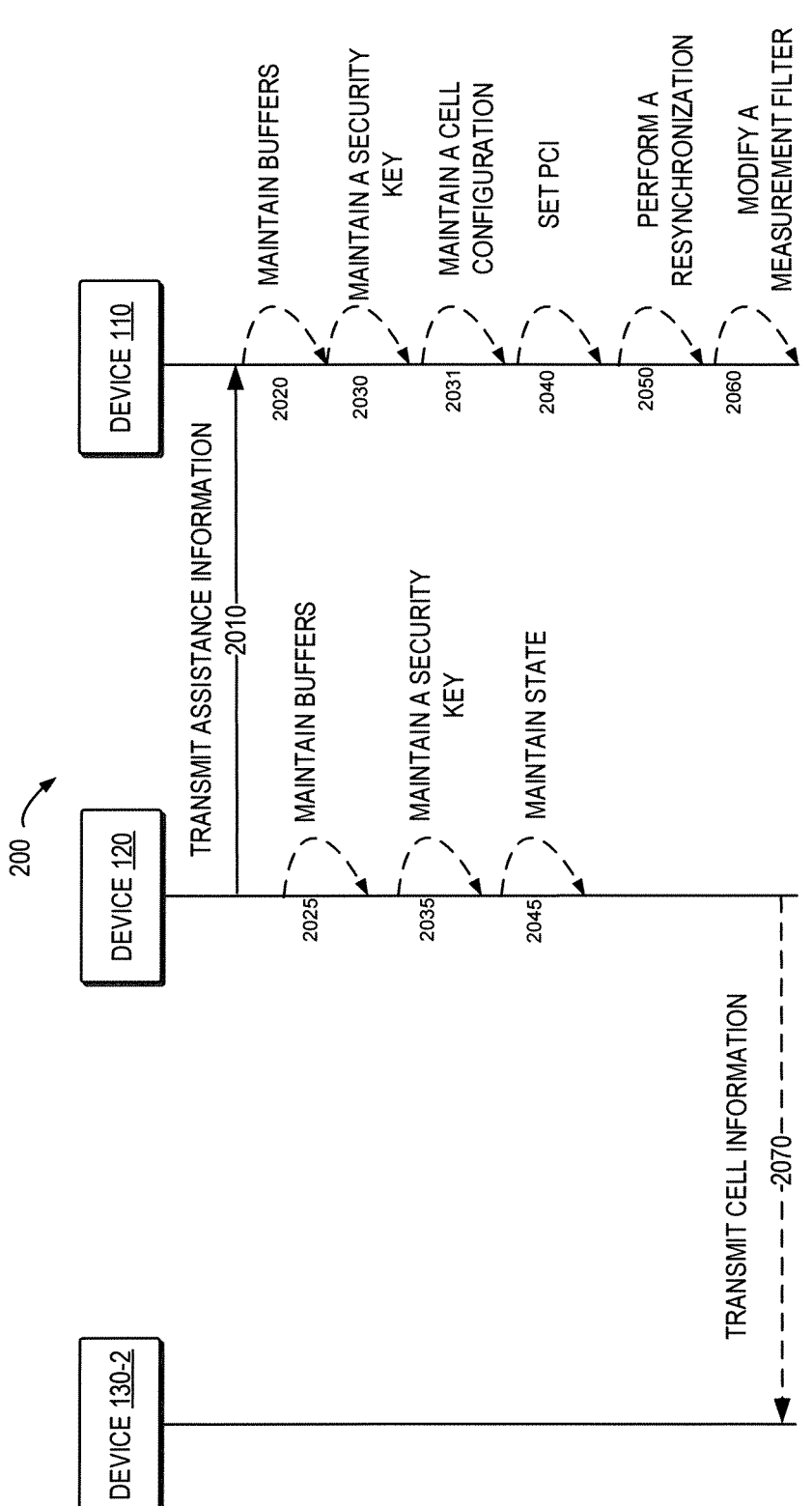
FIG. 2 illustrates a signaling chart of transition to another cell without handover in NTN in which example embodiments of the present disclosure can be implemented.

Reference is now made to FIG. 2, which shows a signaling chart 200 for communication according to some example embodiments of the present disclosure. As shown in FIG. 2, the signaling chart 200 involves the first device 110, the second device 120, the first NTN device 130-1, and the second NTN device 130-2. For the purpose of discussion, reference is made to FIG. 1 to describe the signaling chart 200. By way of example, the first NTN device 120-1 may be the source NTN device and the second NTN device 120-2 may be the target NTN device.

The second device 120 transmits (2010), to the first device 110, assistance information for switching from a source NTN device (i.e., the first NTN device 130-1) to a target NTN device (i.e., the second NTN device 130-2). In other words, the first device 110 receives assistance information from the second device 120. The assistance information may be transmitted via a RRC signaling. It is noted that the assistance information may be transmitted via any proper signaling. By way of example, the first device 110 is currently connecting with the first NTN device 130-1 and will switch from the first NTN device 130-1 to the second NTN device 130-2. In some example embodiments, the assistance information may be transmitted before a service provided by the first NTN device 130-1 expires. In some other example embodiments, the second device 120 may also provide a gap duration for the switching. Alternatively, the second device 120 may provide a start of the cell (i.e., the cell 102) provided by the second NTN device 130-2.

The assistance information includes an indication about a cell identity change associated with the switching. In some example embodiments, the indication may be ignored by the Release 17 UE. In some embodiments, an identity of cell may refer to a physical cell identity. Alternatively, the identity of cell may refer to cell-specific information in SIB1 and it is used to uniquely identify the cell within the network.

In some example embodiments, the indication may include a switching with a cell identity change. For example, the assistance information may indicate satellite with PCI-change where the cell provided after the satellite switching has a different PCI and the PCI is provided. For example, the cell 102 which is provided by the second NTN device 130-2 after the switching may have a different PCI from the cell 101 which is provided by the first NTN device 130-1 before the switching.

Alternatively, the indication may include a switching without the cell identity change. For example, the assistance information may indicate satellite without PCI-change where the cell provided after the satellite switching has the same PCI. The PCI may or may not be provided along with the assistance information.

In some other embodiments, the indication may include a switching with a virtual cell identity change. For example, the assistance information may indicate satellite with virtual PCI-change. In this case, the PCI of the cell 102 may be broadcasted by the new cell changes. Further, an offset to alter PCI calculation or an indication may be provided to the first device 110 (which is a release 18 UE). Thus, the first device may keep using the same PCI. Table 1 below shows examples of information element (IE) of the indication. It is noted that Table 1 is only an example not limitation. In some example embodiments, the first device 110 may be configured with one of the IEs and each of IE may provide a list of configuration actions which are described later.

TABLE 1

| CellChange | CHOICE { |
|---|---|
| withPCI-Change | WithPCI-Change, |
| withoutPCI-Change | WithoutPCI-Change, |
| virtualPCI-Change | VirtualPCI-Change |
| } | |

The first device 110 maintains at least one of the followings for a plurality of alternatives of the indication: a HARQ buffer, security key for radio communication, or a cell configuration. For example, the first device 110 may skip one or more of: HARQ buffer flushing, security key refreshing, and cell configuration updating. In some example embodiments, the first device 110 may maintain (2020) one or more buffers. By way of example, the first device 110 may keep one or more of: a HARQ buffer, a RLC buffer, a PDCP buffer or a SDAP buffer. The first device 110 may maintain at least one of: a control plane configuration and a user plane configuration. In some example embodiments, the first device 110 may also maintain (2030) one or more security keys for radio communication. The first device 110 may also maintain (2031) a cell configuration. For example, the cell configuration may include one or more of: a measurement configuration, cell information (such as, band, frequency, SSB location, random access channel (RACH) configuration, split bearer configuration and the like), carrier aggregation configuration. Advantageously, the buffer will not be flushed even if the PCI may be changed, thereby avoiding resource wastes.

The first device 110 may set (2040) PCI of the cell 102. In some example embodiments, if the first device 110 determines the indication indicates the switching with the cell identity change, the first device 110 may obtain a target physical cell identity associated with the second NTN device 130-2 from the assistance information. In this case, the first device 110 may set a physical cell identity of a serving cell to be the target physical cell identity. That is, the cell 102 may have a different PCI from the cell 101. The first device 110 may maintain the at least one of the HARQ buffer, security key(s) or the cell configuration. In an embodiment, both HARQ buffer and the security key(s) are maintained. The maintained security key(s) may include at least one of the following security keys: $K_{gNB}$ $K_{RRCint}$, $K_{RRCenc}$, $K_{UPint}$, $K_{UPenc}$. In general, any key that is specific to a PCI may be maintained.

Alternatively, if the first device 110 determines that the indication indicates the switching without the physical cell identity change, the first device 110 may maintain a physical cell identity of a serving cell to be unchanged. For example, the cell 102 may have a same PCI as that of the cell 101. The first device 110 may maintain the at least one of: the HARQ buffer, the security key or the cell configuration.

In some other embodiments, if the first device 110 determined that the indication indicates the switching with the virtual changed cell identity, the first device 110 may maintain a source cell identity associated with the first NTN device 130-1 and a target cell identity associated with the second NTN device 130-2. For example, the target cell identity may be broadcast. The first device 110 may keep using the source cell identity based on an offset to alter PCI calculation or the indication. The first device 110 may maintain the at least one of: the HARQ buffer, the security key or the cell configuration.

In some example embodiments, the first device 110 may perform (2050) a resynchronization with the second NTN device 130-2. For example, the first device 110 may resynchronize at a start of the cell 102 which is a new cell. Alternatively, or in addition, the first device 110 may modify (2060) at least one measurement filter at the switching. For example, the first device 110 may reset the at least one measurement filter.

In some example embodiments, the assistance information may include a reference time when the assistance information is valid. For example, the assistance information may include epoch time that is occurring prior to the end of the gap duration of the switching. In this way, the first device 110 may have ephemeris information of the cell 102 ready prior to the switching. Alternatively, or in addition, the assistance information may include ephemeris information of the second NTN device 130-2. In some other embodiments, the assistance information may include a common delay associated with the second NTN device 130-2.

The second device 120 may skip buffer flushing and/or security key refreshing and/or cell configuration updating for the plurality of alternatives of the indication. In some example embodiments, the second device 110 120 maintain (2025) one or more buffers. By way of example, the second device 120 may keep one or more of: a HARQ buffer, a RLC buffer, a PDCP buffer or a SDAP buffer. The second device 120 may maintain at least one of: a control plane configuration and a user plane configuration. In some example embodiments, the second device 120 may also maintain (2035) one or more security key. In an example embodiment, the first device 110 may maintain information that can be changed for a handover. Advantageously, the buffer will not be flushed even if the PCI may be changed, thereby avoiding resource wastes.

The second device 120 may set (2040) PCI of the cell 102. For example, the second device 120 may change the PCI of the cell 101 to the PCI of the cell 102 during the gap duration for the switching.

In some example embodiments, if the indication indicates the switching with the cell identity change, the second device 120 may a target cell identity associated with the second NTN device 130-2 from the assistance information. In this case, the second device 120 may set a physical cell identity of a serving cell to be the target physical cell identity. That is, the cell 102 may have a different identity from the cell 101. The second device 120 may maintain the at least one of: the HARQ buffer, the security key or the cell configuration.

Alternatively, if the indication indicates the switching without the cell identity change, the second device 120 may maintain a physical cell identity of a serving cell to be unchanged. For example, the cell 102 may have a same PCI as that of the cell 101. The second device 120 may maintain the at least one of: the HARQ buffer, the security key or the cell configuration.

In some other embodiments, if the indication indicates the switching with the virtual changed physical cell identity, the second device 120 may maintain a source cell identity associated with the first NTN device 130-1 and a target cell identity associated with the second NTN device 130-2. For example, the target cell identity may be broadcast. The second device 120 may keep using the source cell identity based on an offset to alter PCI calculation or the indication. The second device 120 may maintain the at least one of: the HARQ buffer, the security key or the cell configuration.

In some example embodiments, the second device 120 may maintain (2045) at least one of the following states: a physical (PHY) entity state, a MAC entity state, a RLC entity state, a PDCP entity state, or a RRC entity state. For example, states of PHY, MAC, RLC, PDCDP and RRC entities may be maintained as much as possible.

The second device 120 may transmit (2070) cell information of the cell 102 over the second NTN device 130-2. For example, the cell information may be different from or same as the cell information of the cell 101. By way of example, the second device 120 may transmit a SSB over the second NTN device 130-2. In some example embodiments, the second device 120 may transmit a demodulation reference signal over the second NTN device 130-2. Alternatively, or in addition, the second device 120 may transmit a channel state information reference signal over the second NTN device 130-2. It is noted that the order of the steps 2020, 2025, 2030, 2035, 2040, 2045, 2050, 2069 and 2070 shown in FIG. 2 is only an example not limitation. The steps can be performed in any suitable order.

Figure 3:
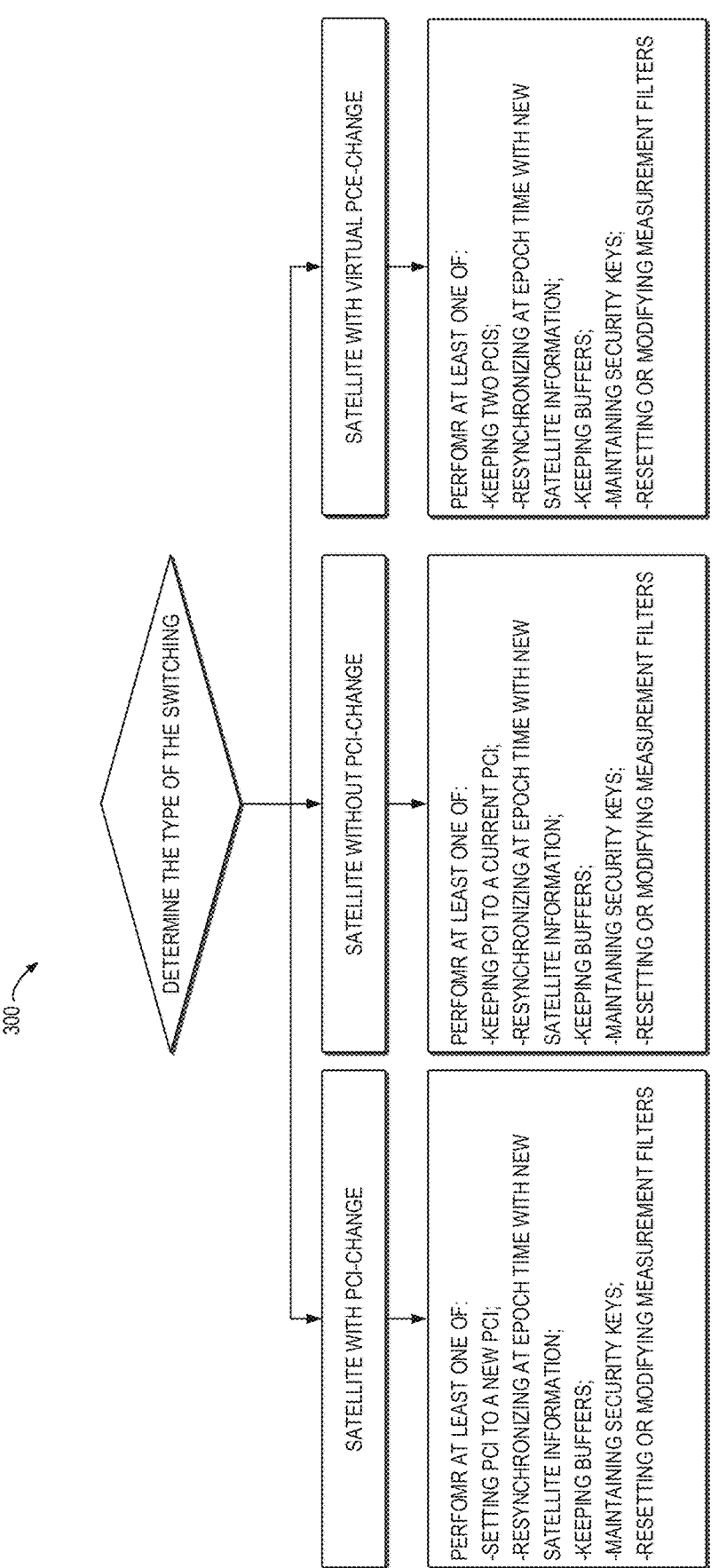
FIG. 3 illustrates a flowchart of a method of transition to another cell without handover in NTN according to some example embodiments of the present disclosure.

FIG. 3 illustrates a flow chart of a method 300 for according to example embodiments of the present disclosure. As shown in FIG. 3, the first device 110 may determine the type of the switching based on the assistance information.

In some example embodiments, if the assistance information indicates the satellite with PCI change, the first device 110 may set the PCI to the new PCI (i.e., the changed PCI). The first device 110 may resynchronize at Epoch time with the satellite information of the second NTN device 130-2. The first device 110 may keep buffers, such as, HARQ, RLC, and PDCP. The first device 110 may maintain security keys for the communication with the second device 120. The first device 110 may reset or modify the measurement filters.

In some other example embodiments, if the assistance information indicates the satellite without PCI change, the first device 110 may keep the PCI (i.e., the unchanged PCI). The first device 110 may resynchronize at Epoch time with the satellite information of the second NTN device 130-2. The first device 110 may keep buffers, such as, HARQ, RLC, and PDCP. The first device 110 may maintain security keys for the communication with the second device 120. The first device 110 may reset or modify the measurement filters.

Alternatively, if the assistance information indicates the satellite with virtual PCI change, the first device 110 may keep two PCIs. For example, one PCI may match the one of the new cells (i.e., the cell 102) and the virtual PCI may be the same as the cell 101. The first device 110 may resynchronize at Epoch time with the satellite information of the second NTN device 130-2. The first device 110 may keep buffers, such as, HARQ, RLC, and PDCP. The first device 110 may maintain security keys for the communication with the second device 120. The first device 110 may reset or modify the measurement filters.

According to embodiments described above, the UE behavior is undefined in relation to HARQ buffers, measurement filters, scheduling information, handling serving cell information after t-Service, etc. Further, release 17 UE can also stay in the cell where handover without PCI change is used, as they can differentiate between the cells.

Figure 4:
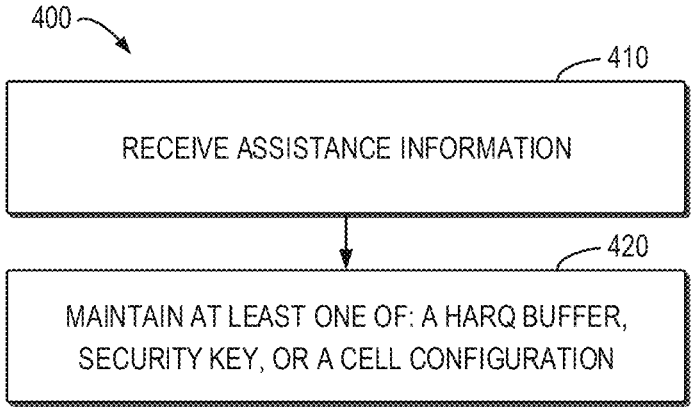
FIG. 4 illustrates a flowchart of a method implemented at a first device according to some example embodiments of the present disclosure.

FIG. 4 shows a flowchart of an example method 400 implemented at an apparatus in accordance with some example embodiments of the present disclosure. For the purpose of discussion, the method 400 will be described from the perspective of the first device 110 in FIG. 1.

At block 410, the first device 110 receives, from a second device 120, assistance information for switching from a source non-terrestrial device to a target non-terrestrial device. The assistance information indicates an indication about a cell identity change associated with the switching.

At block 420, the first device 110 causes at least one of the following to be maintained for a plurality of alternatives of the indication: a hybrid automatic repeat request (HARQ) buffer, security key for radio communication, or a cell configuration.

In some example embodiments, the indication about the cell identity change comprises one of: a switching with a physical cell identity change, a switching without the physical cell identity change, or a switching with a virtual physical cell identity change.

In some example embodiments, the method 400 further comprises: determining that the indication indicates the switching with the physical cell identity change; obtaining a target physical cell identity associated with the target non-terrestrial device from the assistance information; changing a physical cell identity of a serving cell to be the target physical cell identity; and maintaining the at least one of: the HARQ buffer, the security key or the cell configuration.

In some example embodiments, the method 400 further comprises: determining that the indication indicates the switching without the physical cell identity change; maintaining a physical cell identity of a serving cell to be unchanged; and maintaining the at least one of: the HARQ buffer, the security key or the cell configuration.

In some example embodiments, the method 400 further comprises: determining that the indication indicates the switching with the virtual physical cell identity change; maintaining a source physical cell identity associated with the source non-terrestrial device and a target physical cell identity associated with the target non-terrestrial device; and maintaining the at least one of: the HARQ buffer, the security key or the cell configuration.

In some example embodiments, the method 400 further comprises: maintaining at least one of: a control plane configuration and a user plane configuration.

In some example embodiments, the method 400 further comprises: performing a resynchronization with the target non-terrestrial device.

In some example embodiments, the assistance information further comprises at least one of: a reference time when the assistance information is valid, ephemeris information of the target non-terrestrial device, or a common delay associated with target non-terrestrial device.

Figure 5:
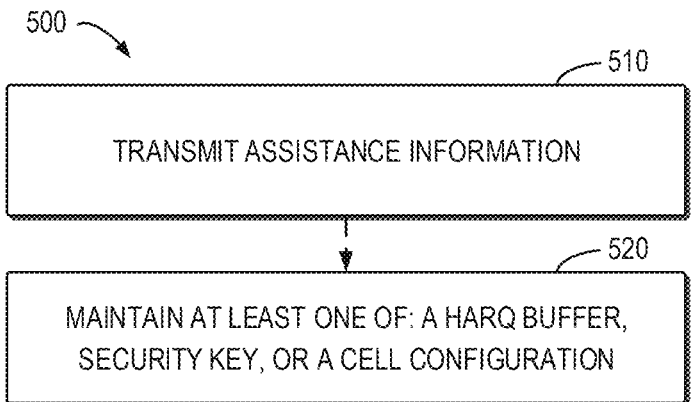
FIG. 5 illustrates a flowchart of a method implemented at a second device according to some example embodiments of the present disclosure.

FIG. 5 shows a flowchart of an example method 500 implemented at a second device in accordance with some example embodiments of the present disclosure. For the purpose of discussion, the method 500 will be described from the perspective of the second device 120 in FIG. 1.

At block 510, the second device 120 transmits, to a first device 110, assistance information for switching from a source non-terrestrial device to a target non-terrestrial device. The assistance information comprises an indication about a cell identity change associated with the switching.

At block 520, the second device 120 causes at least one of the following to be maintained for a plurality of alternatives of the indication: a hybrid automatic repeat request (HARQ) buffer, a security key for radio communication, or a cell configuration.

In some example embodiments, the indication about the cell identity change comprises one of: a switching with a physical cell identity change, a switching without the physical cell identity change, or a switching with a virtual physical cell identity change.

In some example embodiments, the switching the virtual physical cell identity change indicates maintaining a physical cell identity and an unchanged physical cell identity.

In some example embodiments, the method 500 further comprises: determining that the indication indicates the switching with the physical cell identity change; changing a physical cell identity of a serving cell to be a target physical cell identity associated with the target non-terrestrial device; and means for maintain the at least one of: the HARQ buffer, the security key or the cell configuration.

In some example embodiments, the method 500 further comprises: determining that the indication indicates the switching without the physical cell identity change; maintaining a physical cell identity of a serving cell to be unchanged; and maintaining the at least one of: the HARQ buffer, the security key or the cell configuration.

In some example embodiments, the method 500 further comprises: determining that the indication indicates the switching with the virtual physical cell identity change; maintaining a source physical cell identity associated with the source non-terrestrial device and a target physical cell identity associated with the target non-terrestrial device; and maintaining the at least one of: the HARQ buffer, the security key or the cell configuration.

In some example embodiments, the method 500 further comprises: maintaining at least one of: a control plane configuration and a user plane configuration.

In some example embodiments, the method 500 further comprises: maintaining at least one of the following states: a physical entity state, a medium access control entity state, a radio link control entity state, a packet data convergence protocol entity state, or a radio resource control entity state.

In some example embodiments, the assistance information further comprises at least one of: a reference time when the assistance information is valid, ephemeris information of the target non-terrestrial device, or a common delay associated with target non-terrestrial device.

In some example embodiments, a first apparatus capable of performing any of the method 400 (for example, the first device 110 in FIG. 1) may comprise means for performing the respective operations of the method 400. The means may be implemented in any suitable form. For example, the means may be implemented in a circuitry or software module. The first apparatus may be implemented as or included in the first device 110 in FIG. 1.

In some example embodiments, the first apparatus comprises means for receiving, from a second apparatus, assistance information for switching from a source non-terrestrial device to a target non-terrestrial device, wherein the assistance information comprises an indication about a cell identity change associated with the switching; and means for causing at least one of the following to be maintained for a plurality of alternatives of the indication: a hybrid automatic repeat request, HARQ, buffer, a security key for radio communication, or a cell configuration.

In some example embodiments, the indication about the cell identity change comprises one of: a switching with a physical cell identity change, a switching without the physical cell identity change, or a switching with a virtual physical cell identity change.

In some example embodiments, the first apparatus further comprises: means for determining that the indication indicates the switching with the physical cell identity change; means for obtaining a target physical cell identity associated with the target non-terrestrial device from the assistance information; means for changing a physical cell identity of a serving cell to be the target physical cell identity; and means for maintaining the at least one of: the HARQ buffer, the security key or the cell configuration.

In some example embodiments, the first apparatus further comprises: means for determining that the indication indicates the switching without the physical cell identity change; means for maintaining a physical cell identity of a serving cell to be unchanged; and means for maintaining the at least one of: the HARQ buffer, the security key or the cell configuration.

In some example embodiments, the first apparatus further comprises: means for determining that the indication indicates the switching with the virtual physical cell identity change; means for maintaining a source physical cell identity associated with the source non-terrestrial device and a target physical cell identity associated with the target non-terrestrial device; and means for maintaining the at least one of: the HARQ buffer, the security key or the cell configuration.

In some example embodiments, the first apparatus further comprises: means for maintaining at least one of: a control plane configuration and a user plane configuration.

In some example embodiments, the first apparatus further comprises: means for performing a resynchronization with the target non-terrestrial device.

In some example embodiments, the assistance information further comprises at least one of: a reference time when the assistance information is valid, ephemeris information of the target non-terrestrial device, or a common delay associated with target non-terrestrial device.

In some example embodiments, the first apparatus comprises a terminal device, and the second apparatus comprises a network device.

In some example embodiments, the first apparatus further comprises means for performing other operations in some example embodiments of the method 400 or the first device 110. In some example embodiments, the means comprises at least one processor; and at least one memory storing instructions that, when executed by the at least one processor, cause the performance of the first apparatus.

In some example embodiments, a second apparatus capable of performing any of the method 500 (for example, the second device 120 in FIG. 1) may comprise means for performing the respective operations of the method 500. The means may be implemented in any suitable form. For example, the means may be implemented in a circuitry or software module. The second apparatus may be implemented as or included in the second device 120 in FIG. 1.

In some example embodiments, the second apparatus comprises means for transmitting, to a first apparatus, assistance information for switching from a source non-terrestrial device to a target non-terrestrial device, wherein the assistance information comprises an indication about a cell identity change associated with the switching; and means for causing at least one of the following to be maintained for a plurality of alternatives of the indication: a hybrid automatic repeat request, HARQ, buffer, a security key for radio communication, or a cell configuration.

In some example embodiments, the indication about the cell identity change comprises one of: a switching with a physical cell identity change, a switching without the physical cell identity change, or a switching with a virtual physical cell identity change.

In some example embodiments, the switching the virtual physical cell identity change indicates maintaining a physical cell identity and an unchanged physical cell identity.

In some example embodiments, the second apparatus further comprises: means for determining that the indication indicates the switching with the physical cell identity change; means for changing a physical cell identity of a serving cell to be a target physical cell identity associated with the target non-terrestrial device; and means for maintaining the at least one of: the HARQ buffer, the security key or the cell configuration.

In some example embodiments, the second apparatus further comprises: means for determining that the indication indicates the switching without the physical cell identity change; means for maintaining a physical cell identity of a serving cell to be unchanged; and means for maintaining the at least one of: the HARQ buffer, the security key or the cell configuration.

In some example embodiments, the second apparatus further comprises: means for determining that the indication indicates the switching with the virtual physical cell identity change; means for maintaining a source physical cell identity associated with the source non-terrestrial device and a target physical cell identity associated with the target non-terrestrial device; and means for maintaining the at least one of: the HARQ buffer, the security key or the cell configuration.

In some example embodiments, the second apparatus further comprises: means for maintaining at least one of: a control plane configuration and a user plane configuration.

In some example embodiments, the second apparatus further comprises: means for maintaining at least one of the following states: a physical entity state, a medium access control entity state, a radio link control entity state, a packet data convergence protocol entity state, or a radio resource control entity state.

In some example embodiments, the assistance information further comprises at least one of: a reference time when the assistance information is valid, ephemeris information of the target non-terrestrial device, or a common delay associated with target non-terrestrial device.

In some example embodiments, the first apparatus comprises a terminal device, and the second apparatus comprises a network device.

In some example embodiments, the second apparatus further comprises means for performing other operations in some example embodiments of the method 500 or the second device 120. In some example embodiments, the means comprises at least one processor; and at least one memory storing instructions that, when executed by the at least one processor, cause the performance of the second apparatus.

Figure 6:
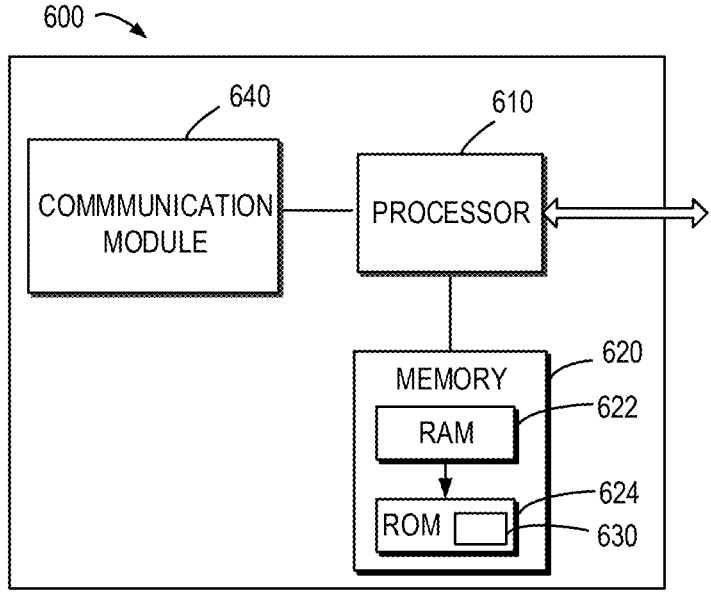
FIG. 6 illustrates a simplified block diagram of a device that is suitable for implementing example embodiments of the present disclosure.

FIG. 6 is a simplified block diagram of a device 600 that is suitable for implementing example embodiments of the present disclosure. The device 600 may be provided to implement a communication device, for example, the first device 110 or the second device 120 as shown in FIG. 1. As shown, the device 600 includes one or more processors 610, one or more memories 620 coupled to the processor 610, and one or more communication modules 640 coupled to the processor 610.

The communication module 640 is for bidirectional communications. The communication module 640 has one or more communication interfaces to facilitate communication with one or more other modules or devices. The communication interfaces may represent any interface that is necessary for communication with other network elements. In some example embodiments, the communication module 640 may include at least one antenna.

The processor 610 may be of any type suitable to the local technical network and may include one or more of the following: general purpose computers, special purpose computers, microprocessors, digital signal processors (DSPs) and processors based on multicore processor architecture, as non-limiting examples. The device 600 may have multiple processors, such as an application specific integrated circuit chip that is slaved in time to a clock which synchronizes the main processor.

The memory 620 may include one or more non-volatile memories and one or more volatile memories. Examples of the non-volatile memories include, but are not limited to, a Read Only Memory (ROM) 624, an electrically programmable read only memory (EPROM), a flash memory, a hard disk, a compact disc (CD), a digital video disk (DVD), an optical disk, a laser disk, and other magnetic storage and/or optical storage. Examples of the volatile memories include, but are not limited to, a random access memory (RAM) 622 and other volatile memories that will not last in the power-down duration.

A computer program 630 includes computer executable instructions that are executed by the associated processor 610. The instructions of the program 630 may include instructions for performing operations/acts of some example embodiments of the present disclosure. The program 630 may be stored in the memory, e.g., the ROM 624. The processor 610 may perform any suitable actions and processing by loading the program 630 into the RAM 622.

The example embodiments of the present disclosure may be implemented by means of the program 630 so that the device 600 may perform any process of the disclosure as discussed with reference to FIG. 2 to FIG. 5. The example embodiments of the present disclosure may also be implemented by hardware or by a combination of software and hardware.

In some example embodiments, the program 630 may be tangibly contained in a computer readable medium which may be included in the device 600 (such as in the memory 620) or other storage devices that are accessible by the device 600. The device 600 may load the program 630 from the computer readable medium to the RAM 622 for execution. In some example embodiments, the computer readable medium may include any types of non-transitory storage medium, such as ROM, EPROM, a flash memory, a hard disk, CD, DVD, and the like. The term "non-transitory," as used herein, is a limitation of the medium itself (i.e., tangible, not a signal) as opposed to a limitation on data storage persistency (e.g., RAM vs. ROM).

Figure 7:
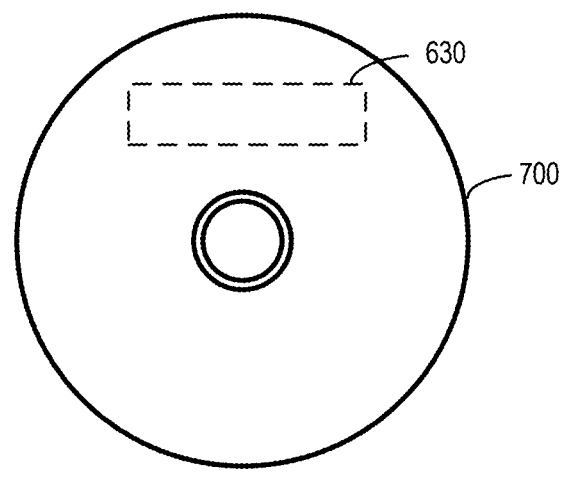
FIG. 7 illustrates a block diagram of an example computer readable medium in accordance with some example embodiments of the present disclosure.

FIG. 7 shows an example of the computer readable medium 700 which may be in form of CD, DVD or other optical storage disk. The computer readable medium 700 has the program 630 stored thereon.

Generally, various embodiments of the present disclosure may be implemented in hardware or special purpose circuits, software, logic or any combination thereof. Some aspects may be implemented in hardware, and other aspects may be implemented in firmware or software which may be executed by a controller, microprocessor or other computing device. Although various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

Some example embodiments of the present disclosure also provide at least one computer program product tangibly stored on a computer readable medium, such as a non-transitory computer readable medium. The computer program product includes computer-executable instructions, such as those included in program modules, being executed in a device on a target physical or virtual processor, to carry out any of the methods as described above. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. The program code may be provided to a processor or controller of a general purpose computer, special purpose computer, or other programmable data processing apparatus, such that the program code, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program code or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, although operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, although several specific implementation details are contained in the above discussions, these should not be construed as limitations on the scope of the present disclosure, but rather as descriptions of features that may be specific to particular embodiments. Unless explicitly stated, certain features that are described in the context of separate embodiments may also be implemented in combination in a single embodiment. Conversely, unless explicitly stated, various features that are described in the context of a single embodiment may also be implemented in a plurality of embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

The invention claimed is:

1. A terminal device comprising:
at least one processor; and
at least one memory storing instructions that, when executed by the at least one processor, cause the terminal device to:
receive, from a network device, assistance information for performing a satellite switch from a source satellite to a target satellite, wherein the assistance information comprises an indication that the satellite switch is without a physical cell identity change, and wherein a serving base station on ground does not change at the switching; and
cause at least a hybrid automatic repeat request, HARQ, buffer to be maintained for the satellite switch without the physical cell identity change.

2. The terminal device of claim 1, wherein the terminal device is further caused to maintain at least one of the following for the satellite switch without the physical cell identity change:
a security key for radio communication, or
a cell configuration.

3. The terminal device of claim 1, wherein the terminal device is further caused to:

determine that the indication indicates the satellite switch without the physical cell identity change;

maintain a physical cell identity of a serving cell to be unchanged; and maintain the at least one of: the security key, or the cell configuration.

4. The terminal device of claim 1, wherein the terminal device is further caused to:

maintain at least one of: a control plane configuration and a user plane configuration.

5. The terminal device of claim 1, wherein the terminal device is caused to:

perform a resynchronization with the target satellite.

6. The terminal device of claim 1, wherein the assistance information further comprises at least one of:

a reference time when the assistance information is valid, ephemeris information of the target satellite, or a common delay associated with target satellite.

7. A network device comprising:

at least one processor; and at least one memory storing instructions that, when executed by the at least one processor, cause the network device to:

transmit, to a terminal device, assistance information for performing a satellite switch from a source satellite to a target satellite switch, wherein the assistance information comprises an indication that the satellite switch is without a physical cell identity change, and wherein a serving base station on ground does not change at the switching; and cause at least a hybrid automatic repeat request, HARQ, buffer to be maintained for the satellite switch without the physical cell identity change.

8. The network device of claim 7, wherein the network device is further caused to maintain at least one of the following for the satellite switch without the physical cell identity change:

a security key for radio communication, or a cell configuration.

9. The network device of claim 7, wherein the network device is further caused to:

determine that the indication indicates the satellite switch without the physical cell identity change;

maintain a physical cell identity of a serving cell to be unchanged; and maintain the at least one of: the security key, or the cell configuration.

10. The network device of claim 7, wherein the network device is caused to:

maintain at least one of: a control plane configuration and a user plane configuration.

11. The network device of claim 7, wherein the network device is caused to:

maintain at least one of the following states:

a physical entity state, a medium access control entity state, a radio link control entity state, a packet data convergence protocol entity state, or a radio resource control entity state.

12. A method comprising:

receiving, at a terminal device and from a network device, assistance information for satellite switch from a source satellite to a target satellite, wherein the assistance information comprises an indication that the satellite switch is without a physical cell identity change, and wherein a serving base station on ground does not change at the switching; and causing, at the terminal device, at least a hybrid automatic repeat request, HARQ, buffer to be maintained for the satellite switch without the physical cell identity change.

13. The method of claim 12, wherein the terminal device further maintains at least one of the following for the satellite switch without the physical cell identity change:

a security key for radio communication, or a cell configuration.

14. The method of claim 12, wherein the terminal device further performs the following:

determining that the indication indicates the satellite switch without the physical cell identity change;

maintaining a physical cell identity of a serving cell to be unchanged; and maintaining the at least one of: the security key, or the cell configuration.

15. The method of claim 12, wherein the terminal device further performs the following:

maintaining at least one of: a control plane configuration and a user plane configuration.

16. The method of claim 12, wherein the terminal device performs a resynchronization with the target satellite.

17. The method of claim 12, wherein the assistance information further comprises at least one of:

a reference time when the assistance information is valid, ephemeris information of the target satellite, or a common delay associated with target satellite.

\* \* \* \* \*